(12) United States Patent
Escribano Bullon et al.

(10) Patent No.: US 8,788,678 B2
(45) Date of Patent: Jul. 22, 2014

(54) IP MULTIMEDIA SUBSYSTEM USER IDENTITY HANDLING

(75) Inventors: Berta Isabel Escribano Bullon, Madrid (ES); Tobias Austrell, Älvsjö (SE); Maria-Carmen Belinchon Vergara, Getafe (ES); Nuria Esteban Vares, Aranjuez (ES); Annika Jonsson, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 13/123,752

(22) PCT Filed: Oct. 15, 2008

(86) PCT No.: PCT/EP2008/063917
§ 371 (c)(1),
(2), (4) Date: Oct. 27, 2011

(87) PCT Pub. No.: WO2010/043261
PCT Pub. Date: Apr. 22, 2010

(65) Prior Publication Data
US 2012/0036270 A1    Feb. 9, 2012

(51) Int. Cl.
*G06F 15/16*    (2006.01)

(52) U.S. Cl.
USPC ........................................................ 709/227

(58) Field of Classification Search
None
See application file for complete search history.

(56) References Cited

U.S. PATENT DOCUMENTS

2008/0198845 A1 * 8/2008 Boman ......................... 370/389
2008/0219241 A1 * 9/2008 Leinonen et al. ............. 370/352
2008/0310612 A1 * 12/2008 Bloebaum et al. ....... 379/215.01

FOREIGN PATENT DOCUMENTS

WO    2008/031924 A1    3/2008

OTHER PUBLICATIONS

ETSI TR 133 978 V6.0.1 ( Apr. 2005)—Universal Mobile Telecommunication System ( UMTS) Security aspects of early IMS ( 3GPP TR 333.978 Version 6.0.1 Release 6.*

* cited by examiner

*Primary Examiner* — Oscar Louie
*Assistant Examiner* — Younes Naji
(74) *Attorney, Agent, or Firm* — Coats & Bennett, PLLC (57) ABSTRACT

A method of handling IP Multimedia Public Identity registration within an IP Multimedia Subsystem network. The method comprises receiving at a Call Session Control Function a SIP REGISTER message including a completed IP Multimedia Public Identity Attribute-Value-Pair and no IP Multimedia Private Identity. The method further comprises deriving at the Call Session Control Function an IP Multimedia Private Identity using the IP Multimedia Public Identity and sending a Cx query from the Call Session Control Function to a Home Subscriber Server, the query including the IP Multimedia Public Identity and the derived IP Multimedia Private Identity. The Home Subscriber Server identifies a subsubscription using the IP Multimedia Public Identity, and determines that the derived IP Multimedia Private Identity is not associated with said subscription. The HSS the identifies a default IP Multimedia Private Identity associated with subscription associated with said subscription, and returns a Cx response to said Call Session Control Function including said default IP Multimedia Private Identity. The Call Session Control Function uses the received, default IP Multimedia Private Identity to further handle said SIP message.

13 Claims, 5 Drawing Sheets

Figure 7 ns: IP MULTIMEDIA SUBSYSTEM USER
IDENTITY HANDLING

TECHNICAL FIELD

The present invention relates to the handling of IP Multimedia Subsystem (IMS) user identities and in particular to the handling of IMS Public User Identities that are shared by two or more IMS Private User Identities.

BACKGROUND

Figure 1:
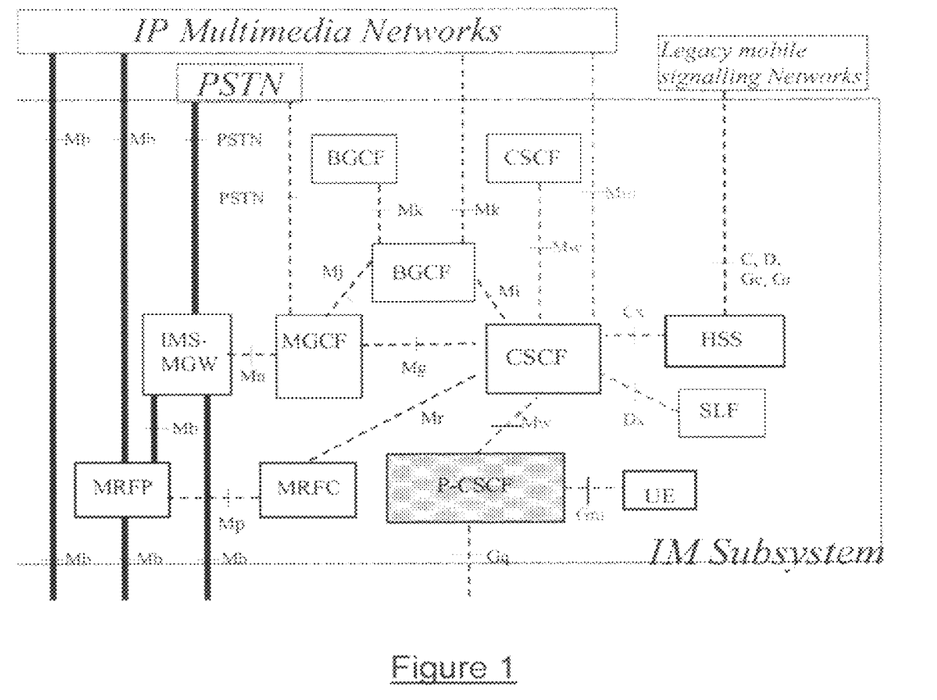
FIG. 1 illustrates schematically an IMS architecture including several different access network types.

The Universal Mobile Telecommunications System (UMTS) is a third generation wireless system designed to provide higher data rates and enhanced services to subscribers. The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet. FIG. 1 illustrates schematically this functionality, where components of the IMS core are interconnected with, by way of example, a PSTN network, a legacy mobile signalling network such as a GSM/GPRS network, and of course IP Multimedia networks such as a 3G network.

The IMS makes use of the Session Initiation Protocol (SIP) to set up and control calls or sessions between user terminals (or user terminals and application servers). SIP makes it possible for a calling party to establish a packet switched session to a called party (using so-called SIP User Agents, UAs, installed in the user terminals) even though the calling party does not know the current IP address of the called party prior to initiating the call. The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.228 V5.8.0 (2004-03).

Referring again to FIG. 1, the IMS core comprises Call/Session Control Functions (CSCFs) that operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

3GPP specifications mandate that every IMS core network subsystem subscriber shall have one or more Private User Identities (IMPI). An IMPI is assigned by the subscriber's home network operator, and is used for IMS registration (i.e. for authorization and authentication purposes). This identity shall take the form of a Network Access Identifier (NAI) as defined in RFC 2486. It should be noted that a subscription may be attached to a person or to an organisation such as a corporation. Nonetheless, in the following discussion the term "user" is used synonymously with the term "Private User Identity".

A user (Private User Identity) may have one or more Public User Identities. The Public User Identity/Identities (IMPU) are used by any user for requesting communications to other users (in the form of SIP URI—IETF RFC 3261 [26]—or a TEL URL—IETF RFC 3966). The relationship between IMPUs and IMPIs is defined by 3GPP Rel-6 onwards and is illustrated schematically in FIG. 2. It is apparent that IMPUs may be shared across multiple IMPIs within the same IMS subscription. Consider a family having a single IMS subscription, with each member of the family being allocated their own IMPI. As well as having their own, personal IMPUs, the family members may share a family IMPU to allow all the members to receive incoming IMS calls directed to the family IMPU.

Figure 2:
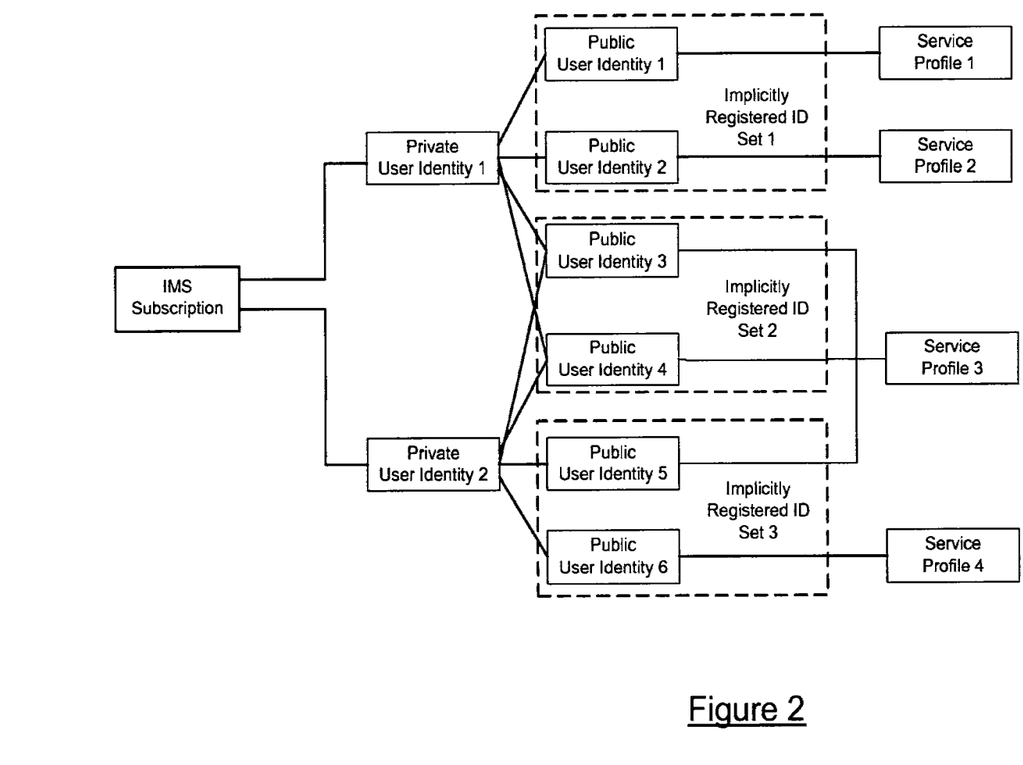
FIG. 2 illustrates schematically the relationship between IMPUs and IMPIs as defined in the relevant 3GPP standards.

A user registers a contact address for an IMPU with the IMS core network, using the SIP Register method. As well as registering a contact address for the IMPU identified in the Register message, the same contact address is registered for any other IMPUs belonging to the same "Implicit Registration Set" (IRS). The IRS construct is also illustrated in FIG. 2.

Figure 3:
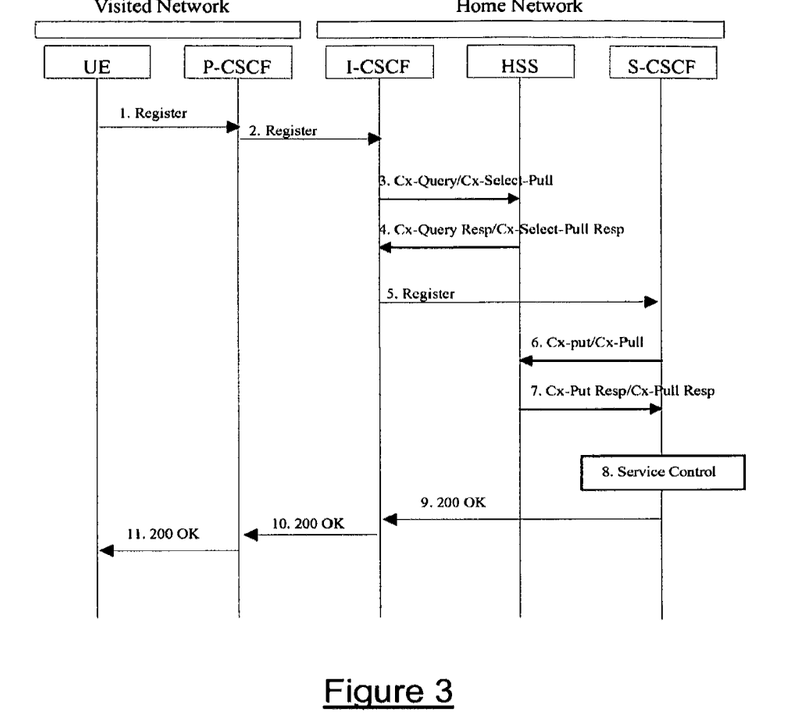
FIG. 3 shows a registration signalling flow in the IMS.

Returning to the subject of IMS registration, the general IMS registration process is illustrated in the signalling flow of FIG. 3 for a User Equipment (UE) comprising an IMS client. The main steps are as follows:

1. The UE sends the Register information flow to the P-CSCF (the Register including the IMPU to be registered, IMPI, home network domain name, and UE IP address).
2. The P-CSCF shall examine the "home domain name" to discover the entry point to the home network (i.e. the I-CSCF). The proxy shall send the Register information flow to the I-CSCF (including the P-CSCF address/name, IMPU, IMPI, P-CSCF network identifier, and UE IP address).
3. The I-CSCF shall send the Cx-Query/Cx-Select-Pull information flow to the HSS (including IMPU, IMPI, P-CSCF network identifier). The HSS shall check whether the user is registered already. The HSS shall indicate whether the user is allowed to register in that P-CSCF network (identified by the P-CSCF network identifier) according to the User subscription and operator limitations/restrictions if any. The HSS performs authorization checks based on the IMPI/IMPU pair. Note that it is mandatory that both the IMPI and IMPU identities are present in the received message.
4. A Cx-Query Resp/Cx-Select-Pull Resp is sent from the HSS to the I-CSCF. It shall contain the S-CSCF name if it is known by the HSS, or the S-CSCF capabilities if it is necessary for the I-CSCF to select a new S-CSCF.
5. The I-CSCF shall send the register information flow (including P-CSCF address/name, IMPU, IMPI, P-CSCF network identifier, UE IP address, and the I-CSCF(THIG) in case network configuration hiding is desired) to the already allocated or selected S-CSCF.
Although not indicated in the flow, 3GPP specifies in another specification (33.210) that, at this point, the S-CSCF initiates authentication procedures for the received IMPU-IMPI pair by sending a Cx-Auth command to the HSS. It is mandatory for authentication purposes to include the IMPI in the Cx interface at this point. Otherwise authentication will fail.
6. Following a successful authentication, the S-CSCF shall send Cx-Put/Cx-Pull (IMPU, IMPI, S-CSCF name) to the HSS.
7. The HSS shall store the S-CSCF name for that user (IMPI) and return the information flow Cx-Put Resp/Cx-Pull Resp (user profile) to the S-CSCF.
8. Based on the user profile, the S-CSCF shall perform whatever service control procedures are appropriate. The S-CSCF will also record the contact address for the registered IMPU (and for any other IMPUs within the same IRS).
9. The S-CSCF shall return the 200 OK information flow (home network contact information) to the I-CSCF.
10. The I-CSCF shall send information flow 200 OK (home network contact information) to the P-CSCF. The I-CSCF shall release all registration information after sending information flow 200 OK.
11. The P-CSCF shall store the home network contact information, and shall send information flow 200 OK to the UE.

It is clear that for the registration process to succeed, the HSS must receive the IMPI/IMPU pair so that it can perform authentication, check if the user is already registered, and apply operator limitations/restrictions if any. This is of course not a problem for user terminals that are provisioned with an IMS Subscriber Identity Module (ISIM) and within which are recorded the appropriate IMPI and IMPU(s), or terminals that are provisioned with a USIM that is capable of generating an IMPI and IMPU from an International Mobile Subscriber Identity (IMSI).

Figure 4:
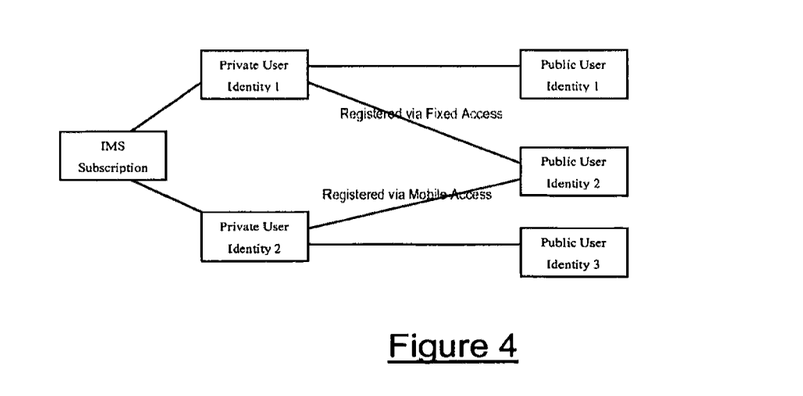
FIG. 4 illustrates schematically example IMPU and IMPI relationships in an FMC scenario.

Fixed-Mobile Convergence (FMC) is being demanded by network operators. In the context of IMS, FMC means the convergence of mobile and fixed access to the IMS system. Operators are working on scenarios that allow the same subscriber to access IMS services using different technologies. This means that the subscriber may sometimes access the IMS network via a fixed access and at other times via a mobile access. Considering the example of FIG. 4, this may give rise to the situation where $IMPI_1$ is registered with $IMPU_2$ via a Fixed access, and $IMPI_2$ is registered with same $IMPU_2$ via a Mobile access.

Legacy terminals of the type used for fixed access (and in some cases for mobile access), although including a SIP client provisioned with an IMPU, do not contain an IMPI or are not otherwise able to generate an IMPI for themselves. To allow for this, the inclusion of the Authorisation header in the Register with username field set to the value of the IMPI, is optional (see 3GPP TS 24.229 section 5.1.1.2.5—Initial registration using NASS-IMS bundled authentication). Furthermore, a mechanism known as "Early IMS" has been specified (3GPP TS 33.978) to allow a user terminal without access to an IMPI to register with the IMS. In order to satisfy the requirement that the HSS must receive the IMPI in the Cx messages from the I-CSCF and the S-CSCF, TS 33.978 provides for the I-CSCF to derive an IMPI from the provided IMPU. In particular, chapter 6.2.5.1 states:

"the Private User Identity (User-Name AVP) in the UAR command shall be derived from the temporary Public User Identity URI being registered by removing URI scheme and the following parts of the URI if present port number, URI parameters, and headers."

The derived IMPU is however most likely disregarded by the HSS, with the HSS using the IMPU to obtain the provisioned IMPI for the purpose of checking if the user is already registered and applying operator limitations/restrictions. However, this effectively precludes IMPU sharing in the context of FMC as otherwise the IMS network would be unable to map the received IMPU to the correct IMPI (i.e. in the absence of the correct IMPI from the Register message).

As the IMS is, too a large extent, blind to access type, this inability on the part of legacy terminals to provide an IMPI prevents implementation of IMPU sharing.

SUMMARY

It is an object of the present invention to allow IMPU sharing across IMPIs, in a manner which allows participation by legacy terminals that do not have access to an IMPI. This and other objects are achieved by providing subscriptions with a default IMPI that is used by the HSS in the case that it receives, from a CSCF, a derived IMPI:

According to a first aspect of the present invention there is provided a method of handling IP Multimedia Public Identity registration within an IP Multimedia Subsystem network. The method comprises receiving at a Call Session Control Function a SIP REGISTER message including a completed IP Multimedia Public Identity Attribute-Value-Pair and no IP Multimedia Private Identity. The method further comprises deriving at the Call Session Control Function an IP Multimedia Private Identity using the IP Multimedia Public Identity and sending a Cx query from the Call Session Control. Function to a Home Subscriber Server, the query including the IP Multimedia Public Identity and the derived IP Multimedia Private Identity. The Home Subscriber Server identifies a subscription using the IP Multimedia Public Identity, and determines that the derived IP Multimedia Private Identity is not associated with said subscription. The HSS the identifies a default IP Multimedia Private Identity associated with said subscription, and returns a Cx response to said Call Session Control Function including said default IP Multimedia Private Identity. The Call Session Control Function uses the received, default IP Multimedia Private Identity to further handle said SIP message.

The Call Session Control Function may be a Serving Call Session Control Function, or an Interrogating Call Session Control Function.

The step of deriving an IP Multimedia Private Identity may comprise employing the IP Multimedia Private Identity derivation process set out in 3GPP TS 33.978.

According to a second aspect of the present invention there is provided apparatus configured to implement a Home Subscriber Server within an IP Multimedia Subsystem network. The apparatus comprises a receiving unit for receiving a Cx query from a Call Session Control Function, the query pertaining to an IMS registration and including the IP Multimedia Public Identity and a derived IP Multimedia Private Identity. It further comprises a processing unit for identifying a subscription using said IP Multimedia Public Identity, determining that the derived IP Multimedia Private Identity is not associated with said subscription, and identifying a default IP Multimedia Private Identity associated with said subscription. A sending unit is provided for returning a Cx response said Call Session Control Function including said default IP Multimedia Private Identity.

According to a second aspect of the present invention there is provided apparatus configured to implement a Call Session Control Function within an IP Multimedia Subsystem network. The apparatus comprises a first receiving unit for receiving a SIP REGISTER message including a completed IP Multimedia Public Identity Attribute-Value-Pair and no IP Multimedia Private Identity. A first processing unit is provided for deriving an IP Multimedia Private Identity using the IP Multimedia Public Identity, whilst a sending unit is provided for sending a Cx query to a Home Subscriber Server, the query including the IP Multimedia Public Identity and the derived IP Multimedia Private Identity. The apparatus further comprises a second receiving unit for receiving from the Home Subscriber Server a Cx response, the response including a default IP Multimedia Private Identity, and a second processing unit for using the received, default IP Multimedia Private Identity to further handle said SIP REGISTER message.

The apparatus may be configured to implement a Serving Call Session Control Function or an Interrogating Call Session Control Function.

Further aspects of the present invention relate to methods of operating a Home Subscriber Server and a Call Session Control Function node.

DETAILED DESCRIPTION

As has already been described above, a mechanism exists for deriving an IMPI using a provided IMPU, at the I-CSCF, in the case of a legacy terminal that is not provided with, or able to otherwise generate, an IMPI. Whilst this allows the Cx messages exchanged between the I-CSCF/S-CSCF and the HSS to satisfy the 3GPP standards requirements, at least in conventional implementations, the HSS does not itself make any use of the derived IMSI. Rather, the HSS uses the IMPU to identify the corresponding IMPI in the user's profile. This approach prevents IMPU sharing between IMPIs.

In order to allow for IMPU sharing, an alternative approach to IMS registration is proposed. This involves assigning a default IMPI to a subscription within the HSS.

This may be an existing IMPI or a specially created IMPI. Whenever the HSS receives a Cx message with an IMPI derived by the I-CSCF (3GPP TS 33.978), the HSS will be unable to identify that IMPI in the IMPI set for the subscriber (identified using the IMPU). The HSS will then make use of the default IMPI associated with the subscription, in particular to apply whatever checks are needed (e.g. user authorization).

Figure 5:
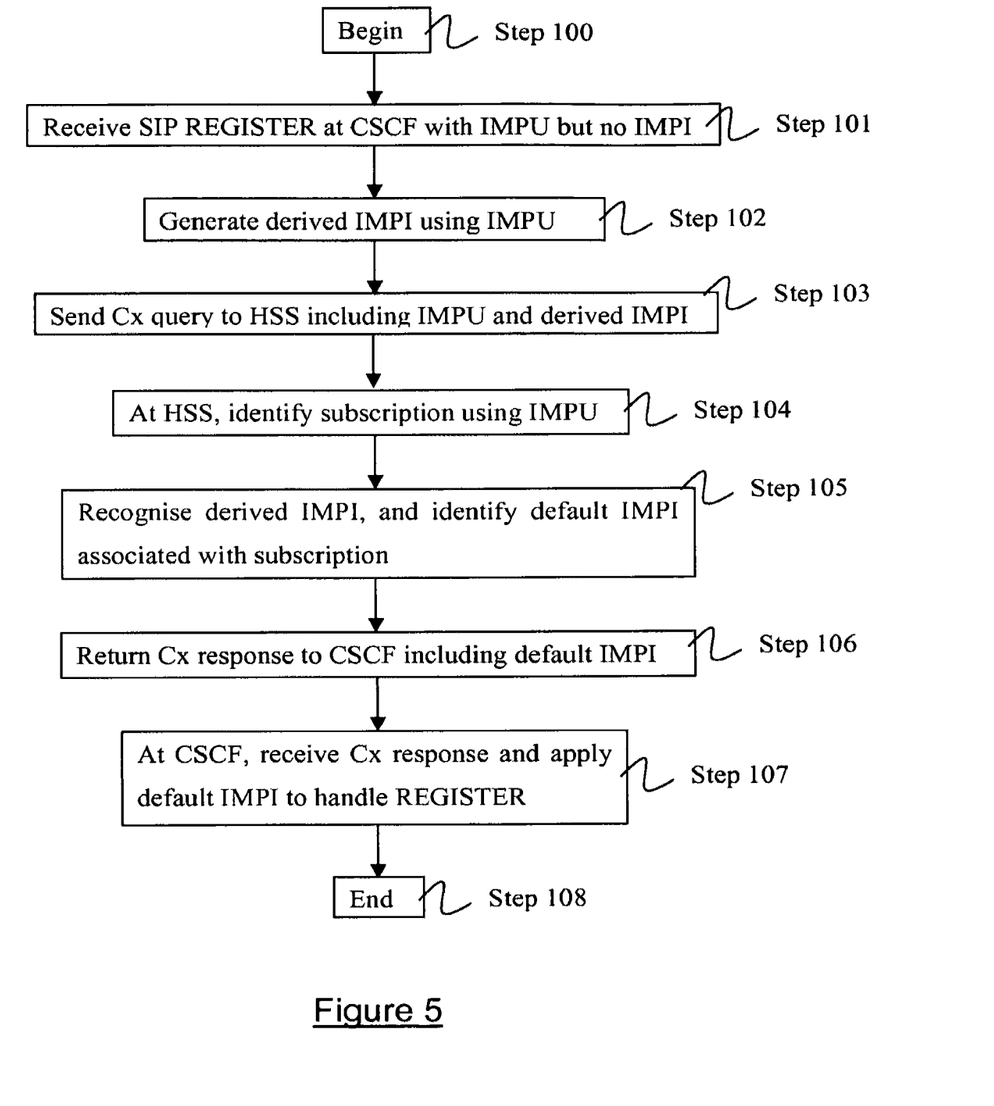
FIG. 5 is a flow diagram illustrating a procedure for mapping a shared IMPU to a default IMPI.

This process will now be described in more detail with reference to the flow diagram of FIG. 5.

1: Upon reception of a traffic message (in this case a REGISTER message) for a shared IMPU coming from a legacy terminal, the I-CSCF introduces a "derived IMPI" in the IMPI Attribute-Value-Pair (AVP).

2: The I-CSCF sends a Cx-Query/Cx-Select-Pull message to the HSS, including the derived IMPI and the shared IMPU.

3: The HSS receives the Cx message with the shared IMPU and the "derived IMPI".

4: The HSS will not find the derived IMPI in the set of IMPIs provisioned for the subscription. It will therefore make an association between the IMPU received and the default IMPI provisioned for the subscription.

5: The HSS will then continue according to the normal traffic flow, returning a Cx-Query Resp/Cx-Select-Pull Resp to the I-CSCF. In particular, the HSS will check for any prior S-CSCF registered in respect of the default IMPI. If an S-CSCF is already allocated to the default IMPI, the HSS will identify the allocated S-CSCF to the I-CSCF, otherwise it will provide the I-CSCF with the required S-CSCF capabilities. NB. The default IMPI is not sent back to the I-CSCF. The process continues at 7.

6: If the HSS does not have a default IMPI provisioned for a given subscription but nonetheless receives a traffic message containing a derived IMPI and a shared IMPU associated with that subscription, the HSS returns an error to the I-CSCF indicating that it does not recognize the user, in which case the I-CSCF drops the message.

7: The I-CSCF forwards the REGISTER message to the identified S-CSCF. The IMPI AVP remains empty.

8: Upon receipt of the REGISTER message (step 101), the S-CSCF once again derives the IMPI from the received IMPU (step 102), and sends this derived IMPI to the HSS in the Cx-Put/Pull message (step 103). The message also includes the IMPU.

9: Again, the HSS identifies the subscription associated with the IMPU (step 104) and will not find the derived IMPI in the set of IMPIs provisioned for the subscription. It will therefore make an association between the IMPU received and the default IMPI provisioned for the subscription (step 105). In this case, the default IMPI is sent back in the Cx-Put/Pull Resp message (step 106). This message includes the service profile for the user.

10: Based upon the user profile, the S-CSCF performs appropriate service control procedures (step 107).

11: The process continues as per normal procedures.

Figure 6:
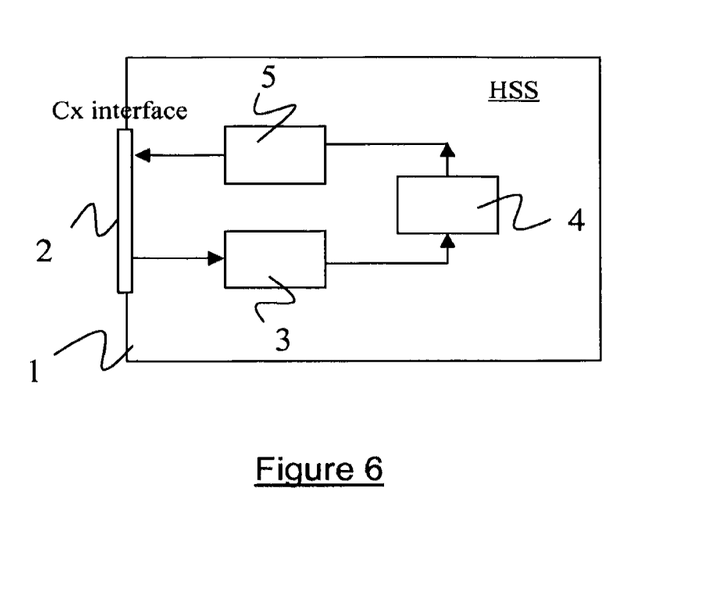
FIG. 6 illustrates schematically an HSS configured to perform IMS registration based on a shared IMPU.

FIG. 6 illustrates schematically an architecture for a HSS. The HSS 1 comprises a Cx interface 2, together with a receiving unit 3 coupled to the Cx interface. This receiving unit handles messages received over the Cx interface, e.g. from the I-CSCF and I-CSCF. The received messages are passed to a processing unit 4 which is configured, inter alia, to access subscriber data including subscriber profiles, e.g. using an IMPU. The processing unit may further identify the presence of a derived IMPI in a REGISTER message, in which case it will extract a default IMPI from the subscriber profile. A sending unit 5 is responsible for assembling and sending Cx messages for sending via the Cx interface. This may include a Cx response containing a default IMPI.

Figure 7:
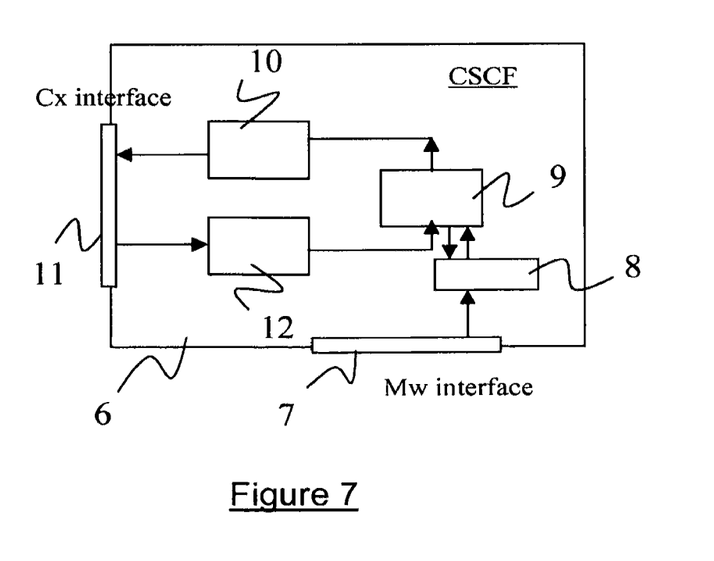
FIG. 7 illustrates schematically a CSCF configured to interact with the HSS using a derived and a default IMPI.

FIG. 7 illustrates schematically an architecture for a CSCF. The CSCF 6 comprises and Mw interface 7 over which SIP messages are received from IMS subscribers. A first receiving unit 8 handles the received SIP messages, including any REGISTER messages, and passes these to a processing unit 9 which is responsible for further handling of the messages including performing HSS queries. The processing unit is configured, for a received REGISTER without IMPI, to generate the derived IMPI according to the applicable standard. A sending unit 10 formulates Cx messages and sends these over a Cx interface 11. Messages received at the Cx interface are passed to a second receiving unit 12, and then to the processing unit 9. As described, in certain cases these Cx replies may contain a default IMPI.

Embodiments of the present invention allow network operators to offer an FMC solution (IMPU sharing) whilst at the same time allowing the use of legacy terminals. As well as being an attractive option for subscribers, use of legacy terminals is likely to increase usage of IMS services, and therefore increase operator revenues. The solution also allows an operator to offer specific behaviour for a user when using a legacy terminal, as having a (default) IMPI effectively allocated to the terminal presents the possibility to have specific attributes for that terminal.

It will be appreciated by the skilled person that various modifications may be made to the above described embodiments without departing from the scope of the present invention. For example, a modification could involve the HSS returning to the I-CSCF, in the Cx response, the default IMPI. The I-CSCF then includes this default IMPI in the REGISTER that it sends to the S-CSCF. There is then no need for the S-CSCF to generate a derived IMPI from the IMPU. Rather the S-CSCF and HSS then adopt the conventional handling processes.

The invention claimed is:

1. A method of handling IP Multimedia Public Identity registration within an IP Multimedia Subsystem network, the method comprising:
   receiving at a Call Session Control Function a SIP REGISTER message including a completed IP Multimedia Public Identity Attribute-Value-Pair and no IP Multimedia Private Identity;
   deriving at the Call Session Control Function an IP Multimedia Private Identity using the IP Multimedia Public Identity indicated in the completed IP Multimedia Public Identity Attribute-Value-Pair;
   sending a Cx query from the Call Session Control Function to a Home Subscriber Server, the query including said IP Multimedia Public Identity and the derived IP Multimedia Private Identity;
   at the Home Subscriber Server, identifying a subscription using the IP Multimedia Public Identity, determining that the derived IP Multimedia Private Identity is not associated with said subscription, identifying a default IP Multimedia Private Identity associated with said subscription, and returning a Cx response to said Call Session Control Function including said default IP Multimedia Private Identity; and
   at said Call Session Control Function, using the received, default IP Multimedia Private Identity to further handle said SIP REGISTER message.

2. The method according to claim 1, wherein said Call Session Control Function is a Serving Call Session Control Function.

3. The method according to claim 1, wherein said Call Session Control Function is an Interrogating Call Session Control Function.

4. The method according to claim 1, wherein said deriving comprises deriving an IP Multimedia Private Identity from said IP Multimedia Public Identity by removing a Uniform Resource Identifier (URI) scheme and, if present, a port number, URI parameters, and headers.

5. An apparatus configured to implement a Home Subscriber Server within an IP Multimedia Subsystem (IMS) network, the apparatus comprising:
   a memory; and
   a processor coupled to the memory configured to execute programmed instructions stored in the memory which cause the processor to:
   receive from a Call Session Control Function a Cx query pertaining to an IMS registration of an IP Multimedia Public Identity, the Cx query including the IP Multimedia Public Identity and a derived IP Multimedia Private Identity that was derived from the IP Multimedia Public Identity;
   identify a subscription using said IP Multimedia Public Identity, determine that the derived IP Multimedia Private Identity is not associated with said subscription, and identify a default IP Multimedia Private Identity associated with said subscription; and
   return a Cx response to said Call Session Control Function including said default IP Multimedia Private Identity.

6. An apparatus configured to implement a Call Session Control Function within an IP Multimedia Subsystem network, the apparatus comprising:
   a memory; and
   a processor coupled to the memory configured to execute programmed instructions stored in the memory which cause the processor to:
   receive a SIP REGISTER message including a completed IP Multimedia Public Identity Attribute-Value-Pair and no IP Multimedia Private Identity;
   derive an IP Multimedia Private Identity using the IP Multimedia Public Identity indicated in the completed IP Multimedia Public Identity Attribute-Value-Pair;
   send a Cx query to a Home Subscriber Server, the query including the IP Multimedia Public Identity and the derived IP Multimedia Private Identity;
   receive from the Home Subscriber Server a Cx response, the response including a default IP Multimedia Private Identity; and
   use the received, default IP Multimedia Private Identity to further handle said SIP REGISTER message.

7. The apparatus according to claim 6, the apparatus being configured to implement a Serving Call Session Control Function.

8. The apparatus according to claim 6, the apparatus being configured to implement an Interrogating Call Session Control Function.

9. A method implemented by a Home Subscriber Server within an IP Multimedia Subsystem network, comprising:
   receiving from a Call Session Control Function a Cx query pertaining to an IMS registration of an IP Multimedia Public Identity, the query including the IP Multimedia Public Identity and a derived IP Multimedia Private Identity that was derived from the IP Multimedia Public Identity;
   identifying a subscription using said IP Multimedia Public Identity; determining that the derived IP Multimedia Private Identity is not associated with said subscription;
   identifying a default IP Multimedia Private Identity associated with said subscription; and
   returning a Cx response to said Call Session Control Function including said default IP Multimedia Private Identity.

10. A method implemented by a Call Session Control Function node within an IP Multimedia Subsystem network, comprising:
    receiving a SIP REGISTER message including a completed IP Multimedia Public Identity Attribute-Value-Pair and no IP Multimedia Private Identity;
    deriving an IP Multimedia Private Identity using the IP Multimedia Public Identity indicated in the completed IP Multimedia Public Identity Attribute-Value-Pair;
    sending a Cx query to a Home Subscriber Server, the query including the IP Multimedia Public Identity and the derived IP Multimedia Private Identity;
    receiving from the Home Subscriber Server a Cx response, the response including a default IP Multimedia Private Identity; and using the received, default IP Multimedia Private Identity to further handle said SIP REGISTER message.

11. The method according to claim 10, wherein said Call Session Control Function node implements a Serving Call Session Control Function.

12. The method according to claim 10, wherein said Call Session Control Function node implements an Interrogating Call Session Control Function.

13. The method according to claim 10, wherein said deriving comprises deriving an IP Multimedia Private Identity from said IP Multimedia Public Identity by removing a Uniform Resource Identifier (URI) scheme and, if present, a port number, URI parameters, and headers.

* * * * *

UNITED STATES PATENT AND TRADEMARK OFFICE
CERTIFICATE OF CORRECTION

PATENT NO. : 8,788,678 B2  Page 1 of 1
APPLICATION NO. : 13/123752
DATED : July 22, 2014
INVENTOR(S) : Escribano Bullon et al.

It is certified that error appears in the above-identified patent and that said Letters Patent is hereby corrected as shown below:

On the Title Page, Item (57), under "ABSTRACT", in Column 2, Line 13, delete "subsubscription" and insert -- subscription --, therefor.

In the Specification

In Column 1, Lines 54-55, delete "Call/Session" and insert -- Call Session --, therefor.

In Column 4, Line 5, delete "too a" and insert -- to a --, therefor.

In Column 4, Line 16, delete "IMPI:" and insert -- IMPI. --, therefor.

In Column 4, Line 26, delete "Control." and insert -- Control --, therefor.

Signed and Sealed this
Twelfth Day of May, 2015

Michelle K. Lee
*Director of the United States Patent and Trademark Office*